(12) United States Patent
Gu et al.

(10) Patent No.: US 11,554,348 B2
(45) Date of Patent: Jan. 17, 2023

(54) METHOD OF PREPARING HIERARCHICAL POROUS CHANNEL MOLECULAR SIEVE MEMBRANE AND APPLICATION THEREOF

(71) Applicant: NANJING UNIVERSITY OF TECHNOLOGY, Nanjing (CN)

(72) Inventors: Xuehong Gu, Nanjing (CN); Xun Yao, Nanjing (CN); Li Peng, Nanjing (CN)

(73) Assignee: NANJING UNIVERSITY OF TECHNOLOGY, Nanjing (CN)

( * ) Notice: Subject to any disclaimer, the term of this patent is extended or adjusted under 35 U.S.C. 154(b) by 532 days.

(21) Appl. No.: 16/348,819

(22) PCT Filed: Jun. 9, 2017

(86) PCT No.: PCT/CN2017/087674
§ 371 (c)(1),
(2) Date: May 9, 2019

(87) PCT Pub. No.: WO2018/086343
PCT Pub. Date: May 17, 2018

(65) Prior Publication Data
US 2019/0262779 A1    Aug. 29, 2019

(30) Foreign Application Priority Data
Nov. 10, 2016  (CN) .......................... 201610990626.0

(51) Int. Cl.
*B01D 67/00* (2006.01)
*B01D 71/02* (2006.01)
(Continued)

(52) U.S. Cl.
CPC ..... *B01D 67/0067* (2013.01); *B01D 67/0051* (2013.01); *B01D 69/02* (2013.01);
(Continued)

(58) Field of Classification Search
CPC ............ B01D 2323/12; B01D 2323/24; B01D 2325/02; B01D 67/0039; B01D 67/0051;
(Continued)

(56) References Cited

U.S. PATENT DOCUMENTS 7,033,968 B1 *  4/2006  Bons ................... B01J 37/0248
                                                          502/4
7,049,259 B1 *  5/2006  Deckman ................ B01J 29/40
                                                          502/4
(Continued)

FOREIGN PATENT DOCUMENTS

| CN | 101585545 A | 11/2009 |
| CN | 101920170 A | 12/2010 |
| CN | 106378013 B | 2/2017 |

*Primary Examiner* — Patrick Orme
(74) *Attorney, Agent, or Firm* — PROI Intellectual Property US; Klaus Michael Schmid (57) ABSTRACT

The invention relates to a method for preparing a hierarchical porous zeolite membrane and an application thereof, comprising the following steps: a mesoporous structure-directing agent is added to limit the growth of zeolite crystals, and self-assembled in the crystallization process to generate a mesoporous structure. Based on a seed crystal induced secondary nucleation mechanism, this method can realize one-step hydrothermal synthesis of hierarchical porous zeolite membrane with the advantages of mild and controllable synthesis conditions, simple process, good repeatability, reduced energy consumption and cost savings. The hierarchical porous zeolite membrane prepared by the method has good cut-off performance, and the cut-off molecular weight is adjustable between 200 to 500,000 Da.

9 Claims, 4 Drawing Sheets

(51) Int. Cl.

| | |
|---|---|
| *C01B 39/24* | (2006.01) |
| *C01B 39/26* | (2006.01) |
| *C01B 39/40* | (2006.01) |
| *C01B 39/54* | (2006.01) |
| *B01D 69/12* | (2006.01) |
| *B01D 69/08* | (2006.01) |
| *C02F 1/44* | (2006.01) |
| *B01D 69/02* | (2006.01) |

(52) U.S. Cl.
CPC ........... *B01D 69/081* (2013.01); *B01D 69/12* (2013.01); *B01D 71/028* (2013.01); *C01B 39/24* (2013.01); *C01B 39/265* (2013.01); *C01B 39/40* (2013.01); *C01B 39/54* (2013.01); *C02F 1/44* (2013.01); *B01D 67/0039* (2013.01); *B01D 69/08* (2013.01); *B01D 2323/12* (2013.01); *B01D 2323/24* (2013.01); *B01D 2325/02* (2013.01); *B01D 2325/20* (2013.01); *C01P 2002/72* (2013.01); *C01P 2004/03* (2013.01); *C01P 2004/61* (2013.01)

(58) Field of Classification Search
CPC .... B01D 67/0067; B01D 69/02; B01D 69/12; B01D 71/028; B01D 2325/20; B01D 69/08; B01D 69/081; C01B 39/24; C01B 39/265; C01B 39/38; C01B 39/40; C01B 39/54; C01P 2004/61; C01P 2002/72; C01P 2004/03; C02F 1/44

See application file for complete search history.

(56) References Cited

U.S. PATENT DOCUMENTS

| | | | |
|---|---|---|---|
| 8,153,099 B2 * | 4/2012 | Yoon | B01D 67/0051 423/707 |
| 2009/0291046 A1 * | 11/2009 | Yoon | C01B 39/40 423/709 |
| 2013/0270188 A1 * | 10/2013 | Karnik | G01N 15/082 210/650 |
| 2015/0265975 A1 * | 9/2015 | Liu | B01D 71/022 96/11 |
| 2021/0214237 A1 * | 7/2021 | Rimer | C01B 39/265 |

* cited by examiner

METHOD OF PREPARING HIERARCHICAL POROUS CHANNEL MOLECULAR SIEVE MEMBRANE AND APPLICATION THEREOF

FIELD OF THE INVENTION

The invention belongs to the field of inorganic membrane preparation, and relates to a preparation method of a hierarchical porous zeolite membrane, in particular to a preparation method of a mesoporous hierarchical porous zeolite membrane and an application thereof in the water treatment process.

BACKGROUND OF THE INVENTION

The membrane separation technology is attracting more attention as one of important technologies for solving key problems of energy, food, environment and water resources in the world due to its high efficiency, energy saving and environmental friendliness. Membrane materials can be divided into organic membranes, inorganic membranes and hybrid membranes according to their composition.

At present, organic membranes are dominated in industrial ultrafiltration membranes or nanofiltration membranes. Even with the advantages of simple preparation process and low cost, their mechanical strength, pollution resistance and solvent resistance still need to be improved to meet the demand of practical use. Inorganic membranes have attracted extensive attention due to their advantages of good chemical stability, heat resistance, high mechanical strength, strong anti-microbial ability, high flux, narrow pore size distribution and long service life, etc. Porous ceramic membrane is a hot research topic worldwide and has been commercialized. Inorganic ceramic membrane materials, including $Al_2O_3$, $ZrO_2$, $SiO_2$ and $TiO_2$, are mainly prepared by solid particle sintering method or sol-gel method. However, besides high calcination energy consumption at high temperature, the sintering method is difficult to control the quality of finished products due to complicated preparation process. The sol-gel method is also complicated. The obtained membrane is prone to crack and repeated coating is necessary to prepare a uniform defect-free film layer, which restricts its scale-up production. Therefore, it is significant to develop a method to prepare inorganic membrane for ultrafiltration or nanofiltration with simple process and low energy consumption.

Zeolite membrane is an inorganic membrane material formed by growing zeolite crystals on the surface of substrates. ZSM-5 membrane is an aluminum-containing MFI type membrane with unique two-dimensional ten-membered ring crossing channels, controllable silicon-aluminum ratio and adjustable surface hydrophilicity/hydrophobicity, and has great application prospect in water treatment.

Due to the small pore size (0.3 nm to 1 nm) and compactness of zeolite membrane, existing zeolite membrane only uses its own microporous structure for separation, and its water purification application is limited to the reverse osmosis process. In 2004, Dong et al. firstly applied the MFI zeolite membrane to the water and salt reverse osmosis separation system (J. Membr. Sci., 2004 (243): 401-404). However, the high operating pressure and the extremely low flux limit its application in the field of water treatment.

Hierarchical pore refers to the introduction of a certain number of mesoporous channels into crystalline microporous zeolites to provide a large specific surface area and pore size. In general, hierarchical porous zeolite particles prepared by a template method or a post-treatment method have shown excellent ability in the catalysis field. The secondary growth method is a common method for synthesizing zeolite membranes, in which the support is pre-coated with seed crystals and placed in the synthesis liquid for hydrothermal crystallization to form the membrane. With the advantages of simple process and low energy consumption compared with the method of ceramic membrane preparation, it can realize one-step hydrothermal synthesis of compact and defect-free zeolite membrane. The key of the invention is to prepare a micro-mesoporous hierarchical porous zeolite membrane by introducing a mesoporous structure-directing agent, and apply it to the water treatment process.

SUMMARY OF THE INVENTION

The purpose of the invention is to provide a method for preparing a hierarchical porous zeolite membrane with simple process and low energy consumption, in particular to a zeolite membrane supported by a porous support; and the invention further provides a preparation method of the membrane material.

In order to realize the technical purpose of the invention, the technical scheme of the invention is as follows:

A method for preparing a hierarchical porous zeolite membrane comprises the following steps specifically:

(1) Preparation of seed crystal: zeolite particles are prepared into a seed crystal suspension;

(2) Seed crystal coating: a continuous and compact seed crystal layer is coated on a porous support by a dip-coating method, dried and calcined to obtain a support coated with the seed crystal;

(3) Synthesis of hierarchical porous zeolite membrane: a silicon source, an aluminum source, an alkali source, a mesoporous structure-directing agent and deionized water are mixed and prepared into a secondary growth mother liquor; the two ends of a support coated with the seed crystal are sealed and placed in a reaction kettle filled with mother liquor, and then dynamically crystallized through scroll synthesis; finally, the mesoporous structure-directing agent is removed to obtain a hierarchical porous zeolite membrane.

Wherein, the silicon source, the aluminum source, the alkali source, the mesoporous structure-directing agent and the deionized water are mixed according to a molar ratio of 1:0.005-2:0.4-4:0.01-0.05:60-250 in the step (3).

The mesoporous structure-directing agent is a surfactant or an organic silane coupling agent. The surfactant is one of cetyl trimethyl ammonium bromide (CTAB), hexadecyl trimethyl ammonium chloride (CTAC) and triblock copolymer ($EO_{20}PO_{70}EO_{20}$, P123), but preferably CTAB. The organic silane coupling agent is one of silanes with different chain length such as dimethyl octadecyl [3-trimethoxysilyl-propyl] ammonium chloride (TPOAC), dimethyl hexadecyl [3-trimethoxysilylpropyl] ammonium chloride (TPHAC), and dimethyl dodecyl [3-trimethoxysilylpropyl] ammonium chloride (TPDAC), but preferably TPOAC.

The silicon source as a secondary growth mother liquor is one of tetraethyl orthosilicate, fumed silica, sodium silicate and silica sol.

The aluminum source as a secondary growth mother liquor is one of aluminum sulfate, sodium metaaluminate, aluminum isopropoxide and aluminum hydroxide.

The alkali source as a secondary growth mother liquor is one of sodium hydroxide, potassium hydroxide, magnesium hydroxide, calcium hydroxide, quaternary ammonium alkali compound, fatty amine compound or alcohol amine compound.

The porous support is hollow fiber, sheet or tube type; and has single-channel or multi-channel shape. The porous hollow fiber support is preferred, as the wall thickness of the hollow fiber is relatively thin, which is favorable for reducing mass transfer resistance and improving membrane flux. Moreover, hollow fibers show wide application prospects in the field of water treatment due to high packing density, high mechanical strength and high temperature resistance. The porous hollow fiber support can be a single-channel or multi-channel, wherein the average pore diameter of the hollow fiber is 0.1 to 5 the outer diameter is 0.5 to 5 mm, and the porosity is 10 to 60%.

The zeolite configuration is preferably one of MFI, LTA, FAU, MOR or CHA, but the optional zeolite is not limited to these configurations and may be BEA, LTL, SOD, GIS, OFF, MTN or AEL The size of zeolite particles prepared in the step (1) is between 50 nm and 500 nm. Now that the size of mesopores and then the cut-off effect are determined by the size of seed crystals, the application field of the zeolite membrane can be expanded by adjusting the mesopores depending on the size of seed crystals.

The invention further provides a zeolite membrane prepared by the method and an application of the zeolite membrane in the field of water treatment.

In the method of the invention for preparing a mesoporous hierarchical porous zeolite membrane, the mesoporous structure-directing agent can be added to limit the growth of zeolite crystals, and self-assembled in the crystallization process to generate a mesoporous structure. The co-existence of micropores and stacking pores in the zeolite membrane significantly improves the pure water flux of the membrane, compared with the existing inorganic ceramic ultrafiltration and nanofiltration membranes. More importantly, based on a seed crystal induced secondary nucleation mechanism, the method realizes one-step hydrothermal synthesis of hierarchical porous zeolite membrane, and has the advantages of mild and controllable synthesis conditions, simple process, good repeatability, reduced energy consumption and cost savings. The hierarchical porous zeolite membrane prepared by the method of the invention shows good cut-off performance on dextran and polyethylene glycol, and the cut-off molecular weight is adjustable between 200 and 500000 Da when the hierarchical porous zeolite membrane is used as a filtering membrane in the field of water treatment. Other hierarchical porous zeolite membranes with different microporous structures can be synthesized in the same way, and can be applied to the filed of water treatment and catalysis, thus having wide industrial production prospect.

DETAILED DESCRIPTION OF THE PREFERRED EMBODIMENT

In order to illustrate the preparation and application of the mesoporous hierarchical porous zeolite membrane of the invention, the embodiments are given, but the protection scope of the invention is not limited to the following embodiments.

Examples 1 to 4 are the preparation of hierarchical porous ZSM-5(MFI type) zeolite membranes, and the specific experimental steps are as follows:

(1) Preparation of Seed Crystal

Silicon dioxide, tetrapropylammonium hydride, sodium hydroxide and water were evenly mixed according to a molar ratio of $SiO_2:TPAOH:NaOH:H_2O=1:0.1-0.5:0.05-0.2:5-23$, and hydrothermally synthesized at 50 to 180° C. for 3 h to 15 d to prepare Silicalite-1 zeolite particles with different sizes ranging from 50 nm to 500 nm. The Silicalite-1 zeolite particles were washed by the deionized water to become neutral, and prepared into a seed crystal suspension with a certain concentration by adding water.

(2) Seed Crystal Coating

The seed crystal suspension was diluted with hydroxypropyl cellulose (HPC) and the deionized water to form a seed crystal liquid with a seed mass content of 0.5% to 5%, its pH value was adjusted to 3-4 by adding dilute nitric acid dropwise, and the seed crystal liquid was ultrasonically dispersed. A continuous and compact seed layer was coated on a porous support by a dip-coating method, dried and calcined at 400 to 600° C. for 3 to 8 h to obtain a support coated with the seed crystal.

(3) Synthesis of Hierarchical Porous Zeolite Membrane

The silicon source, the aluminum source, the alkali source, the mesoporous structure-directing agent and the deionized water were mixed according to a molar ratio of 1:0.005-2:0.4-4:0.01-0.05:60-250, wherein the silicon source was $SiO_2$, the aluminum source was $Al_2(SO_4)_3$, and the alkali source was NaOH (i.e., the molar contents of silicon, aluminum and hydroxide of the selected silicon source, the aluminum source and the alkali source were equivalent to the molar contents of $SiO_2$, $Al_2(SO_4)_3$ and NaOH in the molar ratio); then, they were stirred and aged for 1 to 10 h to prepare into a secondary growth mother liquor. The two ends of the support coated with the seed crystal were sealed with a raw material tape, fixed and placed in a reaction kettle filled with mother liquor, then dynamically crystallized through scroll synthesis at a rate of 2 to 20 rad/min and hydrothermally synthesized at 100 to 180° C. for 4 to 24 h. After complete reaction, the membrane was taken out and washed with the deionized water to become neutral, dried and calcinated in a muffle furnace at 400 to 600° C. for 3 to 8 h, so as to remove the mesoporous structure-directing agent and obtain a hierarchical porous ZSM-5 zeolite membrane.

Example 1

The hierarchical porous ZSM-5(MFI type) zeolite membrane is prepared by the method as follows:

(1) Preparation of Silicalite-1 seed crystals: A synthesis solution with the molar composition of $SiO_2:TPAOH:NaOH:H_2O=1:0.3:0.1:14$ was prepared, and poured into a polytetrafluoroethylene lining of a stainless steel synthesis kettle, and hydrothermally synthesized at 60° C. for 14 d. The prepared Silicalite-1 zeolite had a particle diameter of about 70 nm, and was washed with the deionized water for several times until the pH value of the dispersion liquid tended to be neutral. Then the obtained seed crystals were dispersed in the deionized water to prepare into 10% wt. seed crystal dispersion liquid.

Figure 1:
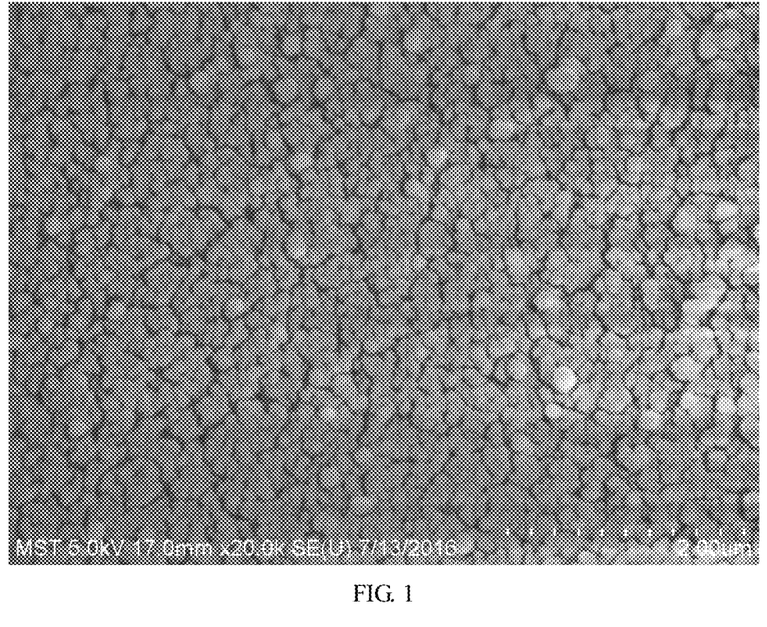
FIG. 1 is a SEM picture of the surface of a hollow fiber coated with Silicalite-1 seed crystal particles in Example 1.

(2) Coating of seed crystal on support (as shown in FIG. 1): The 10% wt. seed crystal dispersion liquid was mixed with the deionized water, dilute nitric acid and hydroxypropyl cellulose to prepare into 1% wt. seed crystal solution, and then stirred for 4 h at room temperature. A four-channel alumina hollow fiber support made by the laboratory was used, with an average pore diameter of 0.5 μm, a porosity of 50% and an outer diameter of 3.7 mm respectively. The two ends of the support were sealed with a raw material tape, and the dip-coating method was used, wherein the crystal coating time is 20 s. Then the support coated with the seed crystals was dried in oven at 60° C. Finally, the support was calcined in a muffle furnace at 450° C. for 8 h, and the heating and cooling rates are 1° C./min respectively.

Figure 4:
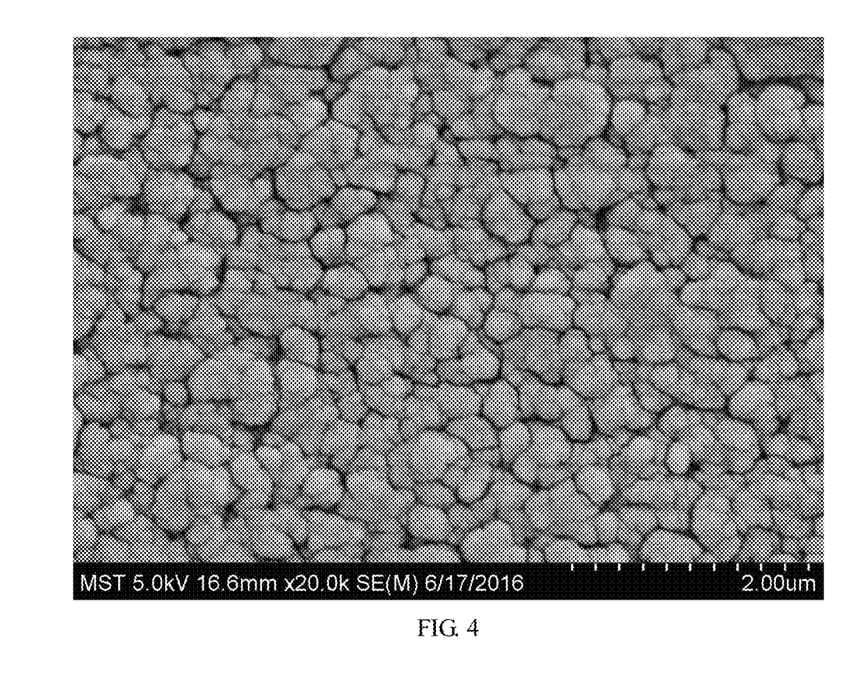
FIG. 4 is a SEM (×20.0 k) picture of the surface of ZSM-5 zeolite membrane on the hollow fiber support in Example 1.
Figure 5:
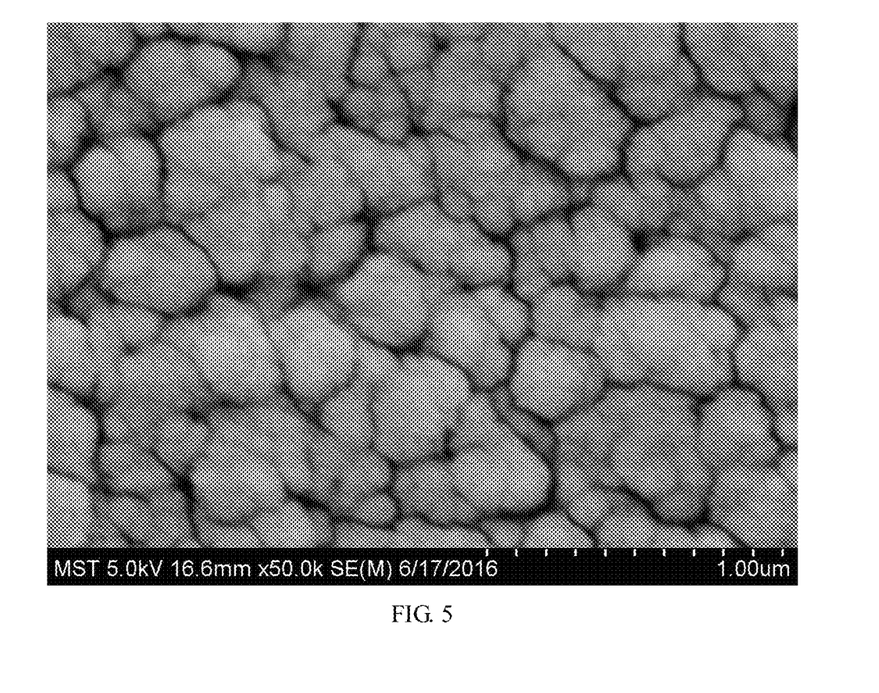
FIG. 5 is a SEM (×50.0.0 k) picture of the surface of ZSM-5 zeolite membrane on the hollow fiber support in Example 1.
Figure 6:
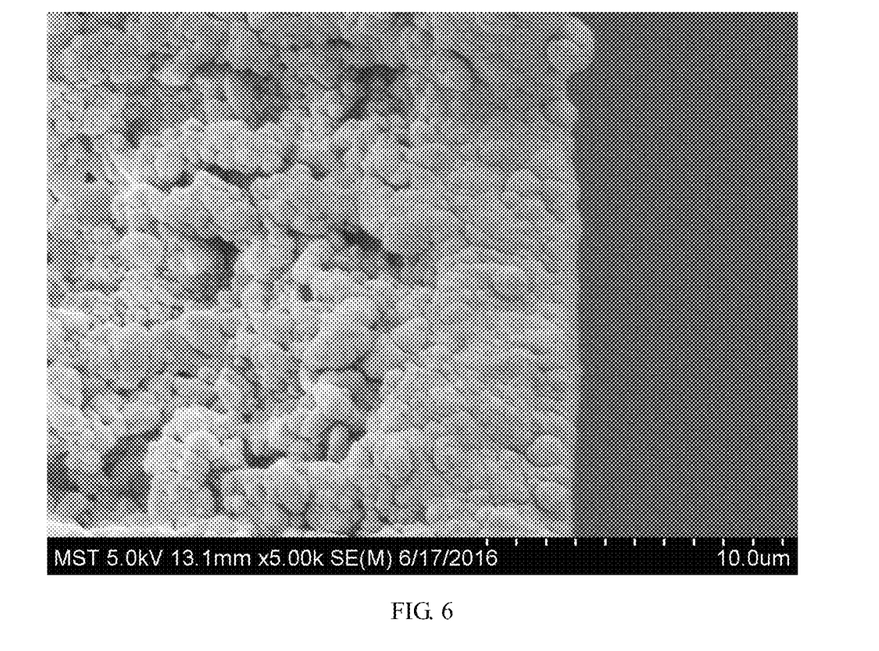
FIG. 6 is a cross-sectional SEM picture of ZSM-5 zeolite membrane on the hollow fiber support in Example 1.
Figure 8:
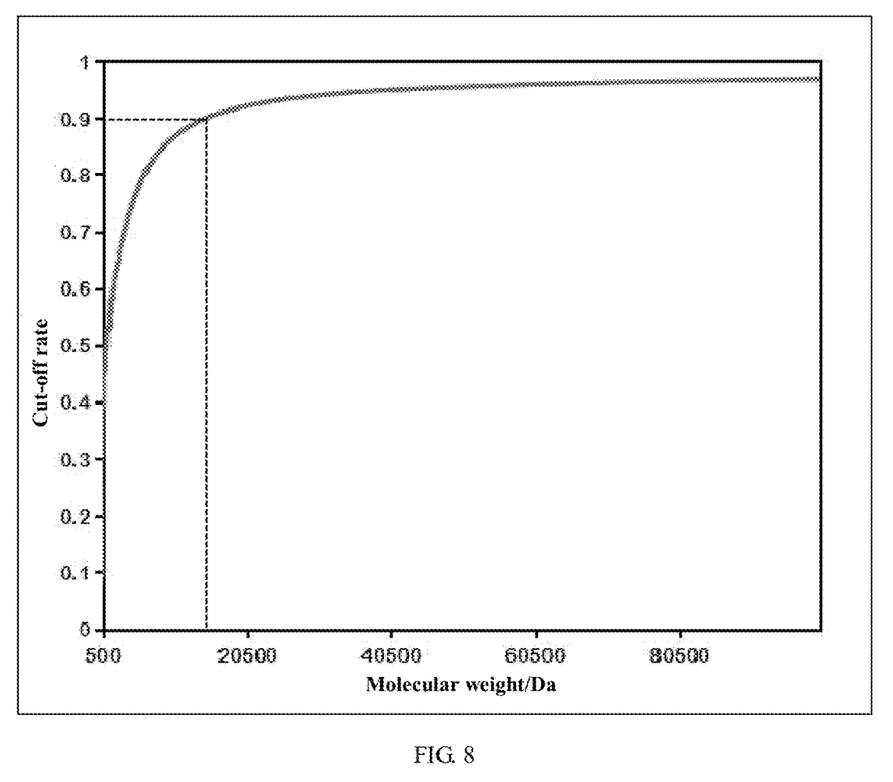
FIG. 8 is the membrane cut-off test result of Example 1.

(3) Preparation of hierarchical porous zeolite membrane: Sodium hydroxide, fumed silica, deionized water, aluminum sulfate and dimethyl octadecyl [3-trimethoxysilylpropyl] ammonium chloride (TPOAC) were evenly mixed by a secondary growth method, wherein the molar ratio of the secondary growth mother liquor was $SiO_2:Al_2(SO_4)_3:NaOH:TPOAC:H_2O=1:0.005:0.56:0.02:138$. The support pre-coated with the seed crystals was placed in the polytetrafluoroethylene lining of a stainless steel synthesis kettle filled with the secondary growth mother liquor, then dynamically crystallized through scroll synthesis at a rate of 5 rad/min and hydrothermally synthesized at 180° C. for 20 h. After complete reaction, the membrane was taken out and washed with the deionized water to become neutral, dried and calcinated in a muffle furnace at 550° C. for 8 h, so as to remove the mesoporous structure-directing agent and obtain a mesoporous hollow fiber ZSM-5 zeolite membrane (as shown in FIG. 4 and FIG. 5). The electron microscope image showed that the zeolite membrane layer was about 6 μm (as shown in FIG. 6), and the X-ray diffraction pattern of the membrane surface was given in FIG. 2, S1. The cut-off test was carried out and the result was given in FIG. 8.

Example 2

Figure 2:
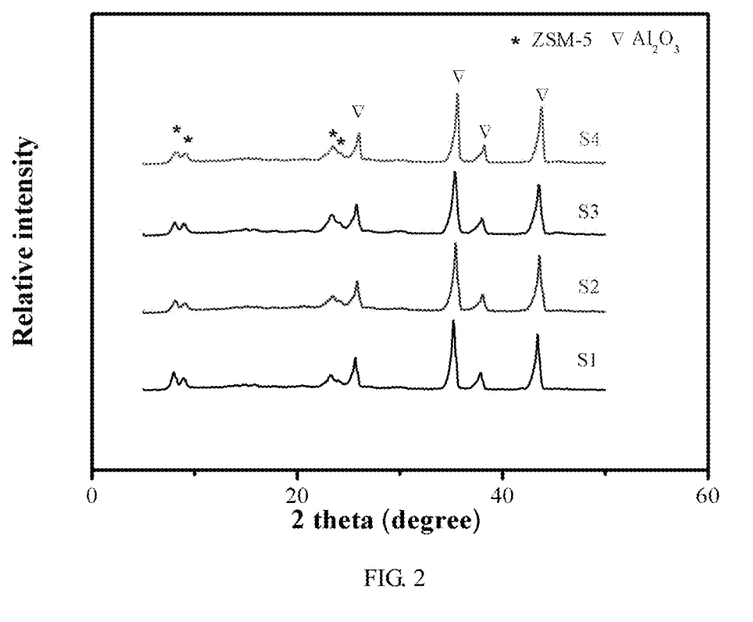
FIG. 2 is an X-ray diffraction pattern of the membrane surfaces of Examples 1(S1) to 4(S4), wherein all four samples have ZSM-5 zeolite characteristic peaks.

The preparation process is shown in Example 1, except for the synthesis conditions of the seed crystal, i.e. hydrothermally synthesized at 120° C. for 12 h to prepare into the Silicalite-1 seed crystal with a particle size of about 400 nm. Other membrane synthesis conditions are the same as in Example 1, and the X-ray diffraction pattern of the membrane surface is shown in FIG. 2, S2.

Example 3

Figure 7:
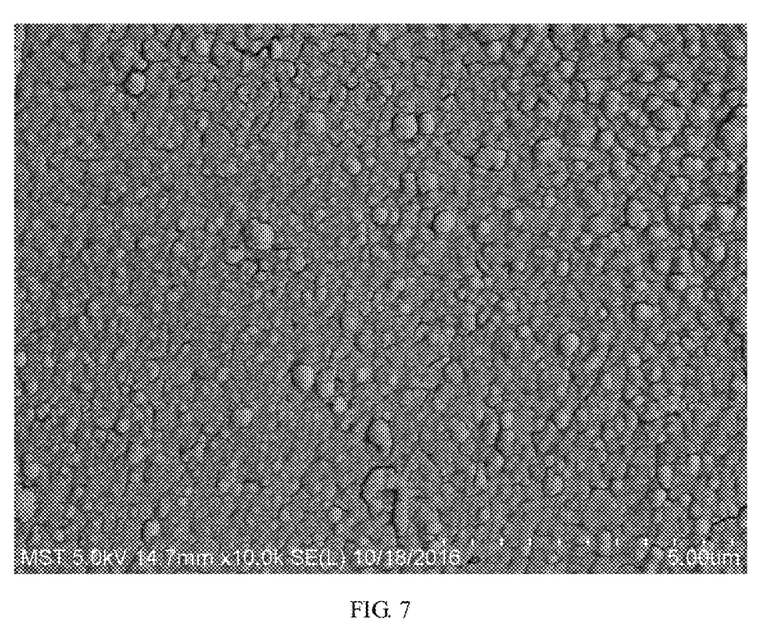
FIG. 7 is a SEM (×10.0.0 k) picture of the surface of ZSM-5 zeolite membrane on the hollow fiber support in Example 3.

The preparation process is shown in Example 1, except that the mesoporous structure-directing agent was changed to cetyl trimethyl ammonium bromide (CTAB), and the molar ratio of secondary growth mother liquor was adjusted to $SiO_2:Al_2(SO_4)_3:NaOH:CTAB:H_2O=1:0.00625:0.56:0.04:138$. Other membrane synthesis conditions are the same as in Example 1. The prepared zeolite membrane is shown in FIG. 7, and its membrane surface X-ray diffraction pattern is shown in FIG. 2, S3.

Example 4

The preparation process is shown in Example 1, except that Silicalite-1 seed crystal with a diameter of about 400 nm was used, and the mesoporous structure-directing agent was changed to cetyl trimethyl ammonium bromide (CTAB). Other membrane synthesis conditions are the same as in Example 1, and the X-ray diffraction pattern of the membrane surface is as shown in FIG. 2, S4.

Example 5

Figure 3:
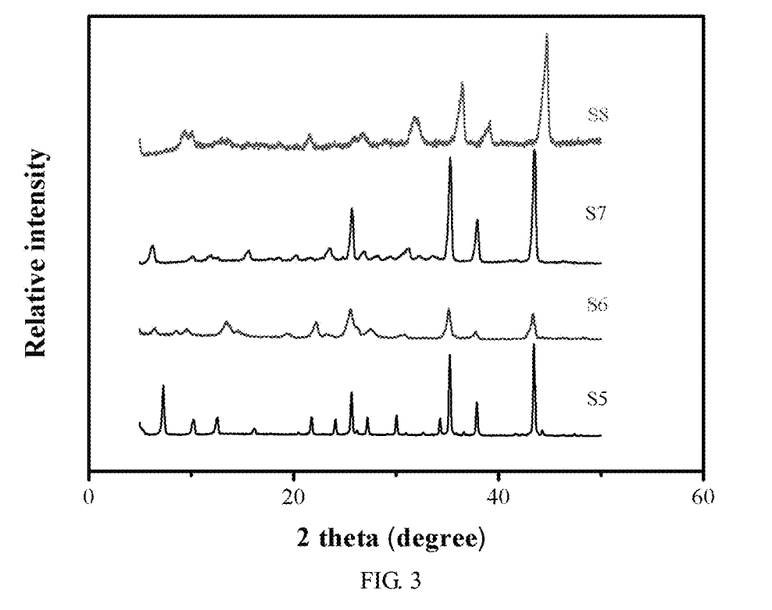
FIG. 3 is an X-ray diffraction pattern of the membrane surfaces of Examples 5(S5) to 8(S8).

NaA zeolite (LTA type) with a particle size of 2 μm was ball milled to obtain 400 nm seed crystals, which were prepared into 1% w.t. seed crystal liquid and coated on the surface of four-channel hollow fibers. An alkali source (sodium hydroxide), an aluminum source (sodium metaaluminate), a mesoporous structure-directing agent (TPOAC) and a silicon source (sodium silicate) were sequentially added into deionized water. The molar ratio of the secondary growth mother liquor was as follows: silicon source:aluminum source:alkali source:mesoporous structure-directing agent:water=1:0.5:2:0.01:60, wherein the silicon source was $SiO_2$, the aluminum source was $Al_2(SO_4)_3$, and the alkali source was NaOH. They were synthesized at 100° C. for 4 h. After complete reaction, the membrane was taken out and washed with the deionized water to become neutral, dried and calcined in a muffle furnace at 550° C. for 8 h, so as to remove the mesoporous structure-directing agent and obtain a mesoporous hierarchical porous NaA zeolite membrane. XRD shows the characteristic peak of LTA type topology zeolite, and the X-ray diffraction pattern of the membrane surface is shown in FIG. 3, S5.

Example 6

The MOR zeolite with a particle size of 15 μm was ball milled to obtain 500 nm of seed crystals, which were prepared into 1% w.t. seed crystal liquid and coated on the surface of a single tube support. An alkali source (sodium hydroxide), an aluminum source (aluminum hydroxide), a mesoporous structure-directing agent (TPOAC) and a silicon source (sodium silicate) were sequentially added into deionized water. The molar ratio of the secondary growth mother liquor was as follows: silicon source:aluminum source:alkali source:mesoporous structure-directing agent:water=1:0.033:0.72:0.02:100, wherein the silicon source was $SiO_2$, the aluminum source was $Al_2(SO_4)_3$, and the alkali source was NaOH. They were synthesized at 170° C. for 16 h. After complete reaction, the membrane was taken out and washed with the deionized water to become neutral, dried and calcined in a muffle furnace at 550° C. for 8 h, so as to remove the mesoporous structure-directing agent and obtain a mesoporous hierarchical porous MOR zeolite membrane. XRD shows the characteristic peak of MOR type topology zeolite, and the X-ray diffraction pattern of the membrane surface is shown in FIG. 3, S6.

Example 7

NaY zeolite (FAU type) with a particle size of about 1 μm was prepared into 1% w.t. seed crystal liquid and coated on the surface of single-channel hollow fibers. An alkali source (sodium hydroxide), an aluminum source (sodium metaaluminate), a mesoporous structure-directing agent (TPOAC) and a silicon source (sodium silicate) were sequentially added into deionized water. The molar ratio of secondary growth mother liquor was as follows: silicon source:aluminum source:alkali source:mesoporous structure-directing agent:water=1:0.09:4:0.03:80, wherein the silicon source was SiO$_2$, the aluminum source was Al$_2$(SO$_4$)$_3$, and the alkali source was NaOH. They were synthesized at 100° C. for 4 h. After complete reaction, the membrane was taken out and washed with the deionized water to become neutral, dried and calcined in a muffle furnace at 550° C. for 8 h, so as to remove the mesoporous structure-directing agent and obtain a mesoporous hierarchical porous NaY zeolite membrane. XRD shows the characteristic peak of FAU type topology zeolite, and the X-ray diffraction pattern of the membrane surface is shown in FIG. 3, S7.

Example 8

SAPO-34 zeolite (CHA type) particles with large particle size were crushed into fine powder of about 300 nm by a high-energy ball mill, prepared into 1% w.t. seed crystal liquid, and coated on the surface of a four-channel hollow fiber. An alkali source (tetraethylammonium hydroxide), an aluminum source (aluminum isopropoxide), a mesoporous structure-directing agent (TPOAC) and a silicon source (silica sol) were sequentially added into deionized water. The molar ratio of secondary growth mother liquor was as follows: silicon source:aluminum source:alkali source:mesoporous structure-directing agent:water=1:2:0.4:0.05:250, wherein the silicon source was SiO$_2$, the aluminum source was Al$_2$(SO$_4$)$_3$, and the alkali source was NaOH. They were synthesized at 180° C. for 24 h. After complete reaction, the membrane was taken out and washed with the deionized water to become neutral, dried and calcined in a muffle furnace at 550° C. for 8 h, so as to remove the mesoporous structure-directing agent and obtain a mesoporous hierarchical porous SAPO-34 zeolite membrane. XRD shows the characteristic peak of CHA type topology zeolite, and the X-ray diffraction pattern of the membrane surface is shown in FIG. 3, S8.

Example 9 (Membrane Cut-Off Performance Test)

Polyethylene glycol (PEG) was used as nanofiltration reference, and 0.75 g of PEG600, 0.75 g of PEG1500, 0.75 g of PEG4000 and 0.75 g of PEG10000 were dissolved in 1 L of deionized water at 0.3 MPa to 0.6 MPa with the aid of the self-made membrane cut-off test device in the laboratory, with a mass concentration of 3 g/L. Dextran was used as ultrafiltration reference, and 2.5 g of dextran 10000, 1 g of dextran 40000, 1 g of dextran 70000 and 2 g of dextran 40000 were dissolved in 1 L of deionized water with a mass concentration of 6.5 g/l. The cut-off molecular weight of raw materials and permeate was measured by gel chromatography (GPC).

The radius of membrane hole is calculated according to the empirical formula: $r=0.033\times(M_w)^{0.46}$.

Where r is the Stocks radius (nm); and Mw is the relative cut-off molecular mass.

The cut-off performance of zeolite membranes prepared in Examples 1 to 4 is as shown in Table 1.

TABLE 1

Cut-off performance of zeolite membranes under different conditions

| Examples | Mesoporous structure-directing agent | Seed size/nm | Pure water flux/kg · (m$^{-2}$ · h$^{-1}$ · Mpa$^{-1}$) | Cut-off molecular weight | Diameter/nm |
|---|---|---|---|---|---|
| 1 | TPOAC | 70 | 84 | 14768 | 5.46 |
| 2 | TPOAC | 400 | 803 | 421000 | 25.51 |
| 3 | CTAB | 70 | 154 | 28430 | 7.38 |
| 4 | CTAB | 400 | 1732 | 490000 | 27.36 |

The cut-off molecular weight coated with 70 nm of small seed crystals is significantly better than that of the 400 nm zeolite membrane, as shown in Table 1. For the cut-off molecular weight is proportional to the seed crystals, the corresponding ultrafiltration and nanofiltration membranes can be prepared by changing the size of the seed crystals. Meanwhile, different mesoporous structure-directing agents also affect the cut-off effect; for example, TPOAC is better than CTAB.

What is claimed is:

1. A method for preparing a hierarchical porous zeolite membrane, wherein a mesoporous structure-directing agent is introduced and self-assembly is carried out on a membrane layer to form a mesoporous structure;
   the method comprising the following steps:
   (1) preparation of seed crystal: zeolite particles are prepared into a seed crystal suspension;
   (2) seed crystal coating: a continuous and compact seed crystal layer is coated on a porous support by a dip-coating method, dried and calcined to obtain a support coated with the seed crystal;
   (3) synthesis of hierarchical porous zeolite membrane: a silicon source, an aluminum source, an alkali source, the mesoporous structure-directing agent and deionized water are mixed and prepared into a mother liquor of secondary growth; two ends of the support coated with the seed crystal are sealed and placed in a reactor filled with the mother liquor, and then dynamical crystallization is carried out under tumbling condition, finally, the mesoporous structure-directing agent is removed to obtain the hierarchical porous zeolite membrane;
   wherein
   the mesoporous structure-directing agent is selected from a surfactant and an organic silane coupling agent in step (3);
   the surfactant is one of cetyl trimethyl ammonium bromide (CTAB), hexadecyl trimethyl ammonium chloride (CTAC) and triblock copolymer (EO$_{20}$PO$_{70}$EO$_{20}$, P123); and
   the organic silane coupling agent is one of dimethyl octadecyl [3-trimethoxysilylpropyl] ammonium chloride (TPOAC), dimethyl hexadecyl [3-trimethoxysilylpropyl] ammonium chloride (TPHAC), and dimethyl dodecyl [3-trimethoxysilylpropyl] ammonium chloride (TPDAC).

2. The method according to claim 1, wherein in step (3) the silicon source, the aluminum source, the alkali source, the mesoporous structure-directing agent and the deionized water are mixed according to a molar ratio of 1:0.005-2:0.4-4:0.01-0.05:60-250.

3. The method according to claim 1, wherein
   the silicon source in step (3) is one of tetraethyl orthosilicate, fumed silica, sodium silicate and silica sol;

the aluminum source is one of aluminum sulfate, sodium metaaluminate, aluminum isopropoxide and aluminum hydroxide; and the alkali source is one of sodium hydroxide, potassium hydroxide, magnesium hydroxide, calcium hydroxide, quaternary ammonium alkali compound, fatty amine compound or alcohol amine compound.

4. The method according to claim 1, wherein step (3) comprises the following steps: the silicon source, the aluminum source, the alkali source, the mesoporous structure-directing agent and the deionized water are mixed according to a molar ratio of 1:0.005-2:0.4-4:0.01-0.05:60-250; then, they are stirred and aged for 1 to 10 h to prepare into the mother liquor of secondary growth; the two ends of the support coated with the seed crystal are sealed with a raw material tape, fixed and placed in the reactor filled with the mother liquor, then the dynamical crystallization is carried out under tumbling condition at a rate of 2 to 20 rad/min and hydrothermal synthesis at 100 to 180° C. for 4 to 24 h;

after complete reaction, the membrane is taken out and washed with further deionized water to become neutral, dried and calcinated in a muffle furnace at 400 to 600° C. for 3 to 8 h, so as to remove the mesoporous structure-directing agent and obtain the hierarchical porous zeolite membrane.

5. The method according to claim 1, wherein the porous support is hollow fiber, sheet- or tube-type, and has single-channel or multi-channel shape.

6. The method according to claim 1, wherein the porous support is a hollow fiber porous support, wherein the average pore diameter of the hollow fiber porous support is 0.1 to 5 µm, the outer diameter of the hollow fiber is 0.5 to 5 mm, and the porosity is 10 to 60%, and the hollow fiber porous support has single-channel or multi-channel shape.

7. The method according to claim 1, wherein the zeolite configuration in step (1) is one of MFI, LTA, FAU, MOR, CHA, BEA, LTL, SOD, GIS, OFF, MTN or AEL.

8. The method according to claim 1, wherein the zeolite particles prepared in step (1) have a particle diameter of 50 nm to 500 nm.

9. A zeolite membrane prepared by the method according to any one of claims 1 to 8.

* * * * *